March 19, 1957 — O. B. H. WERNER — 2,786,177
SATURATION-CONTROLLABLE REACTOR DEVICES
Filed April 9, 1951 — 2 Sheets-Sheet 1

INVENTOR.
Otto Werner
BY
ATTORNEY

March 19, 1957

O. B. H. WERNER 2,786,177

SATURATION-CONTROLLABLE REACTOR DEVICES

Filed April 9, 1951

*INVENTOR.*
Otto Werner
BY

*ATTORNEY*

United States Patent Office 2,786,177
Patented Mar. 19, 1957

2,786,177

SATURATION-CONTROLLABLE REACTOR DEVICES

Otto Bernhard Hermann Werner, Berlin-Siemensstadt, Germany, assignor to Siemens-Schuckertwerke Aktiengesellschaft, Berlin-Siemensstadt, Germany, a corporation of Germany Application April 9, 1951, Serial No. 220,117
In Germany February 11, 1950

Public Law 619, August 23, 1954

Patent expires February 11, 1970

22 Claims. (Cl. 323—66)

My invention relates to electric regulating or control devices for alternating or direct-current loads, and more particularly to regulating or control circuits whose performance is dependent upon variable premagnetization of saturable reactors.

Devices of this kind have become known in which two reactor coils are disposed in respective parallel branches of an alternating-current circuit to be regulated. Instead of providing the reactors with additional premagnetizing coils, the direct current for premagnitizing the reactors may also be passed through the reactor load windings proper thus minimizing the required winding space. In the mentioned parallel connection of two reactors, such an elimination of additional premagnetizing coils can be obtained by dividing the load-circuit winding of each reactor into two portions and connecting into each parallel branch one winding portion of one reactor in series with one winding portion of the other reactor. This provides two circuit points of equal potentials at the respective junctions between the two winding portions of each of the two circuit branches so that the premagnetizing direct voltage can immediately be impressed across these two points. The premagnetizing direct current then flows through two parallel paths and traverses the two portions of one reactor in a direction opposed to the direction of current flow in the winding portions of the other reactor. In this case, however, the entire energy needed for the premagnetization of the reactors must be drawn from the direct-current source furnishing the premagnetizing current.

It is an object of my invention to devise saturable reactor circuits with parallel connected and direct-current premagnetized reactors in which the energy demands upon the premagnetizing direct-current supply are greatly reduced so that smaller direct-current supply means can be used than heretofore necessary in such devices.

Another object of my invention is to improve the controllability of saturable reactor circuits with directly preexcited or self-saturated reactor load windings, so as to make a reactor device of this type readily controllable by a minute premagnetizing current.

In order to achieve these objects as well as the more specific objects and improvements apparent from the following, my invention takes advantage of a known circuit design in which two reactors in the respective two parallel branches of an alternating-current circuit are each series connected with a valve so that one reactor is traversed substantially only by the positive half-waves of the alternating load current while the other reactor carries substantially only the negative current half waves. Such a reactor circuit secures already a certain amount of premagnetization, often called "self-saturation," which is caused by the load current and hence dependent upon the magnitude of that current. According to a feature of the invention, however, such a circuit is combined with a cross circuit which bridges the two reactor branches between respective points intermediate the reactor and valve of each of the two branches and which carries a direct-current flowing through the two reactors in mutually opposing directions so as to provide additional premagnetization of these reactors.

According to another feature of the invention the just-mentioned cross circuit is impressed with a direct voltage which is either constant or regulatable, or which may be dependent upon an electric condition of the load circuit in accordance with any desired law of dependency. This impressed direct voltage may be composed of a plurality of components of different behavior.

The foregoing and other features of my invention will be understood from the embodiments illustrated on the drawings in which Fig. 1 shows schematically the circuit diagram of a regulator for an alternating-current load;

Figure 1:
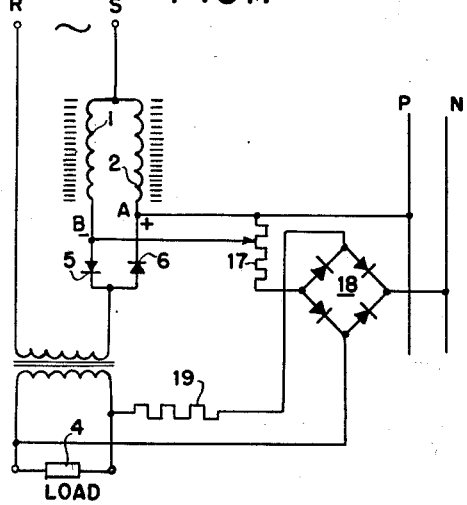

In the device shown in Fig. 1, an alternating-current load 4 is energized through a transformer 3 from supply terminals R and S for connection to a suitable source of alternating current. Connected between the terminal S and the primary of transformer 3 are two parallel circuit branches with respective windings 1 and 2 of two saturable reactors, each reactor winding being series connected with a valve 5 or 6. Valves 5 and 6 are poled in mutually opposing relation so that the half waves of load current flowing from terminal S to transformer 3 can pass substantially only through the reactor 1, while the conversely directed current half waves can flow substantially only through the reactor 2. The alternating voltages induced in the two reactors 1 and 2 are equal at any given moment or can readily be made equal with the aid of calibrating means (not illustrated) so that these induced alternating voltages are balanced between the valve-side end points A and B of the two reactors. Due to the ohmic resistances of the reactor windings, the rectified current flowing through the reactors causes a voltage drop which is manifested by the appearance of unidirectional voltage across points A and B. When half-wave current is flowing from terminal S through reactor 1 to point B, the terminal S is positive relative to point B. During the flow period of the other half wave, i. e. when current is flowing from terminal R through reactor 2 to terminal S, the point A is positive relative to terminal S. Consequently, the point A has always a positive potential relative to point B.

If points A and B are interconnected through a resistor, the potential difference between points A and B drives a direct current through this resistor which reduces the premagnetization of the reactors. The reduction in premagnetization increases in inverse proportion to the resistance of the cross connection. Hence, if the resistance of the cross connection is reduced to zero, i. e., if points A and B are directly short circuited, the premagnetization of the reactors will completely disappear and the reactors assume maximum inductive resistance.

As mentioned, a direct voltage can be impressed between points A and B. In the embodiment of Fig. 1 such an extraneously applied voltage is taken from across an adjusted portion of a voltage dividing resistor 17 energized from a suitable source PN of direct current. If the magnetization of the reactors is to be augmented by the additional direct voltage, this voltage must be large enough to overpower the counter voltage occurring between points A and B due to the load voltage drop in the reactors. In other words, the impressed direct voltage must be larger than the ohmic voltage drop (IR drop) of the reactors.

If a constant direct voltage is impressed across points A and B, the additional premagnetization caused thereby is large at small load currents and decreases with an increase in load current until it reaches the zero value. Such a device may be used, for instance, for giving the load 4 a strongly drooping voltage-current characteristic of the kind desired, for instance, when the current in load 4 is to be kept approximately constant. This tendency is augmented if points A and B are impressed by a direct voltage which is the resultant of a constant component and another voltage component that is variable in proportion to the voltage of the load 4. The last mentioned voltage component can be produced by rectification of the load voltage. This is exemplified in Fig. 1 by a rectifier 18 which is energized from across the terminals of the load 4, preferably through a calibrating resistor 19, and impresses its rectified output voltage on the voltage divider 17 in series relation to the constant voltage source PN.

The voltage divider 17 used in the device according to Fig. 1 facilitates adjusting the magnitude of the additional premagnetization. If the countervoltage between points A and B is larger than the voltage taken from the voltage divider 17, then a direct current will flow from point A through a portion of the voltage dividing resistor 17 to point B, which as mentioned results in a weakening of the premagnetization and hence amounts to an additional counterexcitation of the reactors. This counterexcitation vanishes when the voltage taken from the voltage divider 17 becomes equal to the countervoltage between points A and B. A further increase in voltage supplied from the divider 17 causes an additional premagnetization of the reactors. If the adjustable contact of resistor 17 is fully moved to the upper terminal point of the divider, the two points A and B are short circuited and the reactors, as explained, receive no premagnetization at all. Consequently, the device according to Fig. 1 permits adjusting any desired premagnetization within certain limits, while the direct current source PN connected with the voltage divider need be rated for only a fraction of the premagnetizing energy required for the known apparatus introductorily mentioned.

If the direct voltage impressed across points A and B is proportional to the reactor load current, then the additional premagnetization is also proportional to the reactor current. Hence, the proportion of direct voltage and alternating voltage, depending upon the basic circuit scheme, can therefore be varied in any desired manner. If the direct voltage applied between points A and B is always equal to the countervoltage, no change in premagnetization will occur.

If the direct voltage applied between points A and B is the sum of a component equal to the countervoltage and of another control voltage, then the other control voltage has the same effect as occurring in the known valve-current reactor scheme with a separate control coil whose number of turns and an ohmic resistance correspond to the number of turns and ohmic resistance of the reactor circuit according to the invention. In order to provide the same amount of control energy in the two cases just compared, the known reactor circuit with separate control coils would require a reactor of considerably larger size than a circuit according to the invention. On the other hand, if the two compared devices were to be equipped with reactors of the same type and size, then the circuit according to the invention would permit utilizing the entire available winding space for control purposes, while in a circuit with separate reactor control windings only at most half of that winding space could be utilized for control. With equal numbers of winding turns the latter case would result in a control-circuit resistance and hence in a corresponding magnitude of control energy at least twice as high as the respective values in the device according to the invention. This is also true for the operating or main reactance windings of the reactors, i. e., the voltage drop and the losses in the operating windings under the foregoing premises would only be half as large in circuits according to the invention than with valve-current reactors with separate operating and control windings. Aside from these advantages as regards energy losses, circuit designs according to the invention also result in lower cost of manufacture, as only a single winding is to be placed on each reactor.

It has been mentioned that for securing special effects, additional direct voltages may be impressed upon the cross connection circuit. For instance, to obtain a further reduction in control energy, it is of advantage to introduce a voltage proportional to the reactor voltage drop and of the same direction as the counter voltage occurring between the points A and B.

Figure 2:
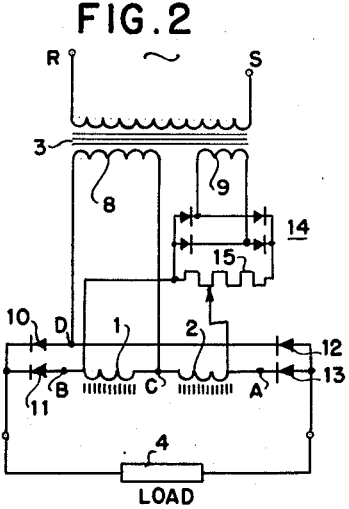
Fig. 2 is a schematic circuit diagram of another regulating device for an alternating-current load.

In the embodiment according to Fig. 2 the load 4 is energized from the secondary winding 8 of a transformer 3 through a full-wave bridge type rectifier composed of valves 10, 11, 12 and 13. With such a direct-current load circuit, the reactors need not be equipped with additional valves, since the corresponding valves of the bridge branches may be utilized for self-saturation of the reactors. For this reason the reactors 1 and 2 in the embodiment of Fig. 2 are disposed on both sides respectively of the same alternating-current supply lead of the rectifier bridge, so that the reactors lie between this alternating-current supply lead and the corresponding adjacent valves 11 and 13 respectively of the rectifier bridge. The valves 11 and 13 therefore take the place of the respective valves 5 and 6 in the embodiment of Fig. 1. The voltage divider 15 in Fig. 2, from which the additional direct control voltage is impressed across the reactor terminal points A and B, is energized through an auxiliary rectifier bridge 14 from a secondary winding 9 of transformer 3. In other respects the embodiment of Fig. 2 is designed and operative as explained in conjunction with Fig. 1.

Obviously, devices according to the invention are readily applicable for three-phase circuits. In this case, each phase is equipped with a pair of reactors with corresponding series valves, which valves may form components of a rectifying bridge. It is then necessary to galvanically isolate from one another the direct current circuits that provide the additional premagnetizing control for the respective phases.

According to another feature of the invention, the direct voltage impressed across the valve-side terminal points of the two reactors is made dependent upon, particularly proportional to, the alternating voltage of the reactors and is applied in the same direction as the direct voltage caused by the load current between the valve side terminal points of the two reactors. As a result, the energy required for the control of the regulating reactors is reduced to a further extent as will be understood from the following.

As explained, the cross connection between the valve-side points of the branch reactors makes it possible that the premagnetizing current of the reactors, which without such a cross connection would be proportional to the load current, can be controled by a slight control energy without requiring a separate premagnetizing coil on the reactors. In particular, the cross connection circuit permits applying a counter excitation of the reactors so as to reduce the load-responsive premagnetization due to the current flowing through the series-connected valves. This effect will occur even if the cross connection circuit is not impressed by voltage from a separate source but has merely an ohmic resistance. However, the effect can be augmented considerably and can be brought into any desired dependency upon other conditions, if, as described above, a source of variable direct voltage is inserted into the cross connection. The premagnetization (self-saturation) caused by the load current produces a unidirectional voltage drop between the valve-side terminal points of the reactors which has the tendency to drive through the cross connection a current acting as a counterexcitation. Hence, if a direct voltage is impressed on the cross circuit which is poled to support the effect of the just-mentioned voltage drop in the cross connection, and which increases and decreases with the alternating voltage at the reactors, then the characteristic of the entire reactor device can be controlled an varied within wide limits in any desired manner dependent upon the dimensioning of this counterexcitation. It can thus be achieved, for instance, that, in the event of variations of the alternating voltage energizing the regulated load circuit, the resulting premagnetization of the reactors changes in such a manner that the load current is kept at a constant value.

Another possibility according to the invention is to make the resulting premagnetization completely independent of the load current. This offers a far-going freedom in the choice of the control or regulating characteristic of the reactor circuit because the characteristic is no longer affected by changes in load and can be given any desired configuration, for instance, by providing another premagnetizing current source between the valve-side terminal points of the branch reactors, only a very slight energy and no additional premagnetizing reactors being needed for this purpose. The direct voltage thus impressed on the cross connection can be simply derived from an auxiliary rectifier energized from secondary windings of the respective branch reactors. It is preferable in such devices, to give the two branch reactors respective secondary windings of the same number of winding turns and to connect the two secondary reactor windings in parallel relation to each other. Then the two secondary windings have also the function to subdue or eliminate the effect of upper harmonics occurring at the branch reactors.

Figure 3:
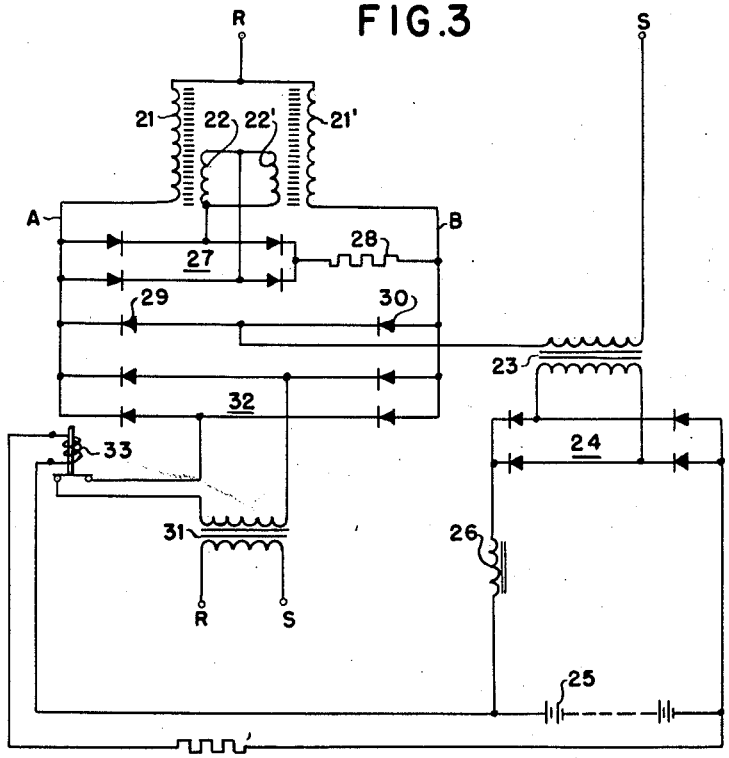
Fig. 3 shows schematically the circuit diagram of a regulating device for charging a battery.

The foregoing features of the invention are embodied in the charging device for a buffer battery shown in Fig. 3. The primary winding of a power transformer 23 is energized from terminals R and S for connection to an alternating-current line. The connection of terminal R with the transformer primary includes two circuit branches with the respective main windings 21, 21' of two branch reactors. The secondary winding of transformer 23 is connected to a bridge type rectifier 24 whose output terminals are connected to a buffer battery 25 in series with a smoothing reactor 26. Series connected with each reactor main winding 21 and 21' is a valve 29 or 30. Valves 29 and 30 are opposingly poled so that one half wave of load current flows through reactor winding 21 while the next half wave flows through reactor winding 21'. Hence, each reactor is traversed by load current in always the same direction so that a load-responsive premagnetization (self-saturation) is effective. Due to the ohmic voltage drop in the two reactor main windings, the valve-side terminal lead A of winding 21 assumes a positive potential relative to the valve-side lead B of winding 21'.

The two branch reactors have respective auxiliary windings 22 and 22' parallel connected with each other. The voltages induced in the auxiliary windings are proportional to the alternating voltage of the main reactor circuit. The induced secondary voltage is rectified by an auxiliary rectifier 27 and is impressed across a cross connection circuit that interconnects the two valve-side terminal points of the main reactors and includes an ohmic series resistor 28. The valves of the auxiliary rectifier 27 are poled so that the voltage of the auxiliary reactor windings 22 and 22', rectified by these valves, will augment the current driven through the cross connection and resistor 28 by the above-mentioned potential difference between leads A and B. Consequently, a counter excitation is produced which is proportional to the alternating voltage of the main reactors due to the fact that the larger the current through resistor 28 the smaller is the direct current flowing through the reactor windings 21 and 21'.

Another auxiliary rectifier 32 connected to the same valve-side terminal leads of the main reactor windings 21 and 22 is energized from a transformer 31 whose primary is connected to terminals R and S that may be identical with the equally denoted terminals mentioned previously or that may be energized from the same alternating current line. The rectifier 32 impresses across leads A and B a direct voltage acting in the same sense as the load dependent premagnetizing (self-saturating) direct current. In this manner, an additional excitation of the reactors is provided which can be regulated or controlled in any desired manner by varying the alternating current feeding the rectifier 32. In the illustrated embodiment, this additional excitation is used for maintaining the voltage of the buffer battery 25 within desired or permissible voltage limits. For this purpose, a control relay 33 is energized by the battery voltage and interrupts the energizing circuit of the auxiliary rectifier 32 when the battery reaches its upper voltage limit, while restoring excitation for rectifier 32 when the battery voltage drops to its lower limit. When the contact of relay 33 opens, the additional premagnetization disappears so that the resultant premagnetization drops, and the charging current for the battery declines.

It will be recognized from the foregoing that the provision of counterexcitation according to the invention offers the advantage that, for the control of the reactors over the entire available control range, only a positive or unipolar additional excitation is needed. For a given balance condition of the counterexcitation, the additional excitation alone determines the magnitude of the load current within the normal regulating range of the reactor independently of the magnitude of the alternating voltage at the reactor. For maintaining constant load current, it is merely necessary to supply the reactors with constant additional excitation.

Referring to regulating devices with two alternately conducting and parallel-connected main reactors whose valve-side terminal points are impressed with controllable direct voltage as described in the foregoing, another improvement according to the invention can be obtained by connecting an auxiliary control reactor in series with the regulating or main reactor and providing the auxiliary reactor with a secondary winding whose voltage is impressed through a rectifier across the valve-side terminal points of the main reactors. The secondary voltage of the control reactor is controlled by a separate control winding. Thus a conductive connection between the control circuit of the auxiliary reactor and the alternating-current circuit of the main reactor is avoided. Consequently, such a device can be used under conditions where an isolation between control and load circuits is required. Besides, the controlling auxiliary reactor also operates as a magnetic amplifier. As long as the rectified voltage taken from the secondary of the control reactor is equal or smaller than the load-responsive countervoltage at the regulating main reactor, nothing is changed as far as the premagnetization of the regulating reactor is concerned; but when the rectified voltage of the control reactor exceeds the countervoltage, a control current is forced through the regulating reactor with the effect of augmenting the premagnetization. The alternating voltage of the control reactor can readily be varied within the required range by applying to this reactor an additional premagnetization with the aid of the separately controllable winding.

It is generally preferable to compose the control reactor of two reactor portions and to connect these two portions in the two circuit branches of the main reactors and pertaining valves because the premagnetization of the control reactor is then also dependent upon the load current.

To achieve that the regulating or main reactor can be controlled practically over its entire working range by additional premagnetization produced by the control reactor, a counterpremagnetization can be applied to the regulating reactor. This countermagnetization can be produced, for instance, by an approximately constant unidirectional voltage. However, it is usually preferable to make the countermagnetization dependent upon the voltage of the regulating reactor itself because then the control energy is still further reduced. To this end, the device may be designed, for instance, so that the two reactor portions supply respective opposingly poled half waves of counterexcitation.

The embodiment and modifications shown in Figs. 4 to 7 will exemplify the last mentioned improvement features. According to Fig. 4, a load not further identified, for instance, a rectifier for a buffer battery, is energized from the secondary winding of a transformer 47. Series connected with the primary of transformer 47 is a regulating reactor composed of two parallel windings 41 and 41'. A tap of each winding is connected with the alternating-current supply terminal R. The lower two terminal leads A and B of the regulating reactor windings are connected with each other through valves 45 and 46, the valve poling being such that the half waves of alternating load current flowing from terminal S through transformer 47 to terminal R are conducted by valve 45 and flow through winding 41, while the half waves of opposite polarity flow through winding 41' and valve 46. Due to the ohmic resistance of the regulating reactor windings 41 and 41', the load current causes a voltage drop which results in the occurrence of a direct voltage across the valve-side reactor leads A and B. In the illustrated circuit, lead A is always positive relative to lead B. Another tap point of each main reactor winding is connected through a valve 48 or 49 with the upper end point of the other main reactor winding whereby a counterpremagnetization is produced.

Figure 5:
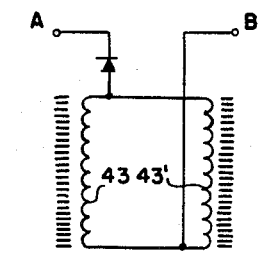
Figs. 5, 6 and 7 show respectively different modifications of a component circuit for a device according to Fig. 4.
Figure 6:
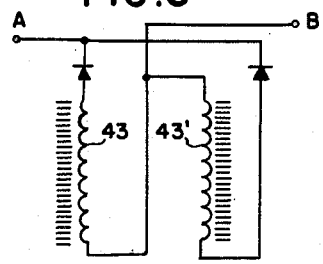
Figure 7:
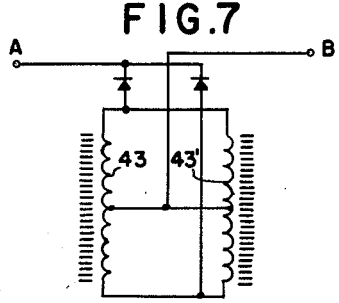

According to the invention the device is equipped with a control reactor which is again composed of two parts. The main winding 42 of one part lies in series with the regulating reactor winding 41 and valve 45. The main winding 42' of the other part is series connected with winding 41' and valve 46. The two partial control reactors have respective secondary windings 43 and 43' parallel connected to a bridge type rectifier 50 whose direct current terminals are connected to leads A and B, so that the rectified voltage opposes the voltage (countervoltage) caused between leads A and B by the load current. Instead of the bridge type rectifier 50, a half-wave or two-phase rectifier circuit may, of course, be chosen, several other possibilities of such rectifier connections being illustrated in Figs. 5, 6 and 7. It is to be understood that the secondary windings 43, 43' with the appertaining secondary rectifier circuit shown in any one of Figs. 5, 6 and 7, are to be connected between leads A and B in lieu of the reactor secondaries 43 and 43' and the pertaining rectifier 50 of Fig. 4.

Figure 4:
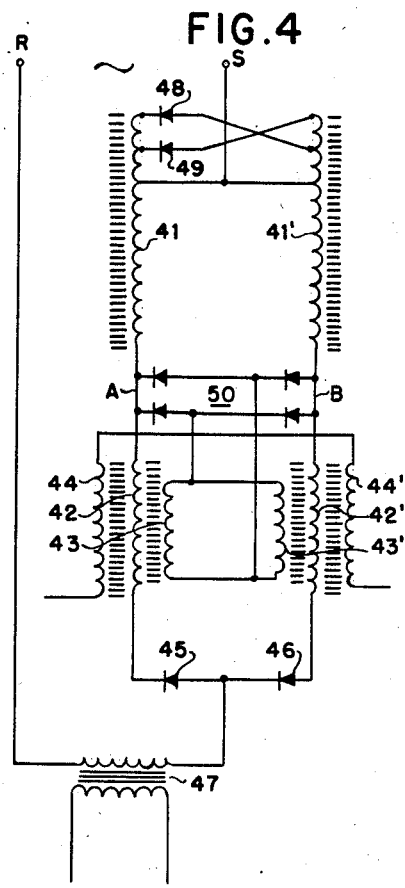
Fig. 4 is the schematic circuit diagram of another saturable reactance device for the regulation and control of an alternating current load.

Each unit of the control reactor according to Fig. 4 has a control winding 44 or 44' which may be excited in dependence upon any desired controlling magnitude. For instance, when feeding a buffer battery, the control voltage applied to the windings 44, 44' may be dependent upon the difference between a constant reference voltage and the battery voltage. Due to the presence of valves 45, 46 in combination with the particular circuit connection, the premagnetization of the regulating reactor 41, 41' is responsive to current. This is also true with respect to the premagnetization of the control reactor. Consequently, the voltage at the control reactor windings, in rough approximation, is also proportional to the load current and hence is suitable for compensating the load-dependent counter voltage obtaining at the regulating reactor between leads A and B. As mentioned, the premagnetization of the regulating reactor does not change as long as the rectified voltage from rectifier 50 stays below the countervoltage. However, when the countervoltage is exceeded, a control current will flow through the regulating reactor with the effect of increasing the premagnetization and reducing the alternating reactor voltage. By varying the control current in the control winding, the desired regulation can be effected, the required control energy being extremely small.

As is apparent from the foregoing, the invention can be embodied in various circuits of diversified designs, and it will be obvious to those skilled in the art upon a study of this disclosure that modifications and variations other than those specifically described can readily be made without departure from the essence of the invention and within the scope of the claims annexed hereto.

I claim:

1. A saturable-reactor device, comprising alternating-current terminals and two parallel circuit branches connected between said terminals, each of said branches having a reactor and a valve series-connected with each other, said two valves being opposingly poled to conduct during positive and negative half waves respectively of the alternating-current; and a cross connection extending between respective points of said two branches intermediate the reactor and valve of each branch and forming together with said two reactors a direct-current premagnetizing circuit whose current traverses said reactors in mutually opposing directions, said premagnetizing circuit having a source of direct voltage and having at said points a voltage poling in opposition to that of said respective valves.

2. A saturable-reactor device, comprising alternating-current supply terminals and load terminals and having two parallel branches between said supply terminals and said load terminals, each of said two branches having a saturable-reactor and a valve series connected with each other, said valves being mutually opposingly poled to conduct positive and negative half waves respectively of the alternating-current, a direct-current circuit connected across said two branches between respective points intermediate the reactor and valve of each branch, and direct-current supply means of variable voltage connected in said latter circuit and having at said points a poling opposed to that of said respective valves so that said circuit is closed through said two reactors.

3. A saturable-reactor device, comprising alternating-current supply terminals and load terminals and having two parallel branches between said supply terminals and said load terminals, each of said two branches having a saturable reactor and a valve series connected with each other, said valves being opposingly poled to conduct positive and negative current half waves respectively, a direct-current cross connection circuit extending between respective points intermediate the reactor and valve of each branch, and load-responsive direct-voltage supply means connected with said circuit to impress thereon a voltage dependent upon an electric load condition of the reactor circuit.

4. A saturable-reactor device, comprising current supply terminals and load terminals and having two parallel branches between said supply terminals and said load terminals, each of said two branches having a saturable-reactor and a valve series connected with each other, said valves being opposingly poled to conduct positive and negative half waves respectively of the alternating current, and a direct-current circuit connected across said two branches between respective points intermediate the reactor and valve of each branch and having between said points a first voltage poled in opposition to the flow polarity of said respective valves so that said circuit is closed through said two reactors, voltage supply means connected with said circuit and having between said two points a second voltage opposed to said first voltage, said second voltage having a component proportional to the voltage across said reactors.

5. A saturable-reactor device, comprising alternating-current supply terminals and load terminals and having two parallel branches between said supply terminals and said load terminals, each of said two branches having a saturable-reactor and a valve series connected with each other, said valves being opposingly poled to conduct positive and negative current half waves respectively, a cross circuit connected across said two branches between respective points intermediate the reactor and valve of each branch, and rectifier means inputwise connected with at least one of said reactors to be impressed with voltage proportional to reactor voltage and outputwise connected with said cross circuit to impress between said points a rectified control voltage substantially proportional to said reactor voltage.

6. A saturable-reactor device, comprising alternating-current supply terminals and load terminals and having two parallel branches between supply terminals and said load terminals, each of said two branches having a saturable-reactor and a valve series connected with each other, said valves being opposingly poled to conduct positive and negative current half waves respectively, a cross circuit connected across said two branches between respective points intermediate the reactor and valve of each branch, each of said reactors having an auxiliary secondary winding for inducing secondary voltages in said respective windings, rectifier means inputwise connected to said two windings with said windings parallel to each other, said rectifying means being outputwise connected with said cross circuit to impress upon said cross circuit a rectified voltage substantially proportional to the alternating reactor voltage.

7. A saturable-reactor device, comprising alternating-current supply terminals, a battery load circuit, two circuit branches extending parallel between said terminals and said load circuit and having a saturable-reactor and a valve series connected in each branch, said two valves being opposingly poled for conductance of positive and negative current half waves respectively, a direct-current cross circuit connected across said branches between respective points intermediate the reactor and valve of each branch, first direct-voltage supply means having a variable voltage dependent upon the supply voltage at said terminals and being poled to oppose load-current variations due to supply-voltage fluctuations, second direct-voltage supply means parallel connected with said first direct-voltage supply means and being poled to increase the premagnetization of said reactors, and a relay connected with said second direct-voltage supply means for connecting and disconnecting the latter, said relay having a voltage-responsive control circuit connected across said load circuit to operate when the voltage of said load circuit departs from a given limit condition.

8. A reactor device according to claim 2, comprising saturable control reactor means series connected with the aforesaid reactors and having a saturation control circuit and a secondary circuit, rectifier means inputwise connected with said secondary circuit and outputwise connected with said direct-current circuit to impress rectified voltage across said points.

9. A reactor device according to claim 2, comprising two saturable control reactors connected in said respective branches in series with the aforesaid respective control circuits and respective secondary windings, rectifying means inputwise connected with said secondary windings and inputwise connected with said direct-current circuit to impress rectified voltage across said points.

10. A saturable-reactor device, comprising alternating-current supply terminals and load terminals and having two parallel branches between said supply terminals and load terminals, a regulating reactor and a valve series connected with each other in each of said respective branches, said valves being opposingly poled, said two regulating reactors having respective counterexcitation circuits to oppose saturation caused by load current, a cross circuit connected between respective points of said branches intermediate the regulating reactor and valve of each branch, and control reactor means series connected with at least one of said regulating reactors and having a saturation control circuit and a secondary winding circuit, rectifier means inputwise connected with said winding circuit and outputwise connected with said direct-current circuit to impress rectified voltage across said points.

11. In a reactor device according to claim 10, said counterexcitation circuits being connected with said respective regulating reactors to be excited by the voltage of said respective reactors.

12. In a reactor device according to claim 10, said counterexcitation circuit of each reactor being connected across a portion of the other reactor to be excited by voltage from said other reactor, and said two excitation circuits having respective valve means opposingly poled to conduct successive current half waves respectively.

13. A saturation-controlled reactor device, comprising alternating-current supply terminals, direct-current load terminals, a rectifier bridge connecting said supply terminals with said load terminals and having parallel bridge branches with respective series-connected valves, two saturable-reactors series-connected in two adjacent ones of said branches to form two parallel circuit branches between said alternating-current and direct current load terminals, said saturable reactors having a common circuit point connected with one of said supply terminals, and a circuit extending across respective points intermediate the reactor and valve of each of said latter two branches, said circuit comprising a source of direct-current voltage and being poled at said points in opposed relation to the flow direction of said respective valves so that said circuit is closed through said respective reactors.

14. A saturation-controlled reactor device, comprising alternating-current supply terminals, direct-current load terminals, a rectifier bridge connecting said supply terminals with said load terminals and having parallel bridge branches with respective series-connected valves, two saturable reactors series-connected in two adjacent ones of said branches to form two parallel circuit branches between said alternating-current and direct-current load terminals, said saturable reactors having a common circuit point connected with one of said supply terminals, and a circuit extending across respective points intermediate the reactor and valve of each of said latter two branches, said circuit comprising direct-current voltage supply means having adjustable potentiometer means for controlling the voltage across said points in opposed relation to the flow direction of said respective valves so that said circuit is closed through said respective reactors.

15. A saturation-controlled reactor device, comprising alternating-current supply terminals, direct-current load terminals, a rectifier bridge connecting said supply terminals with said load terminals and having parallel bridge branches with respective series-connected valves, two saturable reactors series-connected in two adjacent ones of said branches to form two parallel circuit branches between said alternating-current and direct-current load terminals, said saturable reactors having a common circuit point connected with one of said supply terminals, and a circuit extending across respective points intermediate the reactor and valve of each of said latter two branches, said circuit comprising D.-C. voltage supply means having a controllable resistance and being poled at said points in opposed relation to the flow direction of said respective valves so that said circuit is closed through said respective reactors.

16. A saturation-controlled reactor device, comprising alternating-current supply terminals, direct-current load terminals, a rectifier bridge connecting said supply terminals with said load terminals and having parallel bridge branches with respective series-connected valves, two saturable reactors series-connected in two adjacent ones of said branches to form two parallel circuit branches between said alternating-current and direct-current load terminals, said saturable reactors having a common circuit point connected with one of said supply terminals, and a circuit extending across respective points intermediate the reactor and valve of each of said latter two branches, said circuit comprising D.-C. voltage supply means and a voltage-dividing rheostat connected with said supply means and having an adjustable portion series-connected in said cross connection, said supply means being poled at said points in opposed relation to the flow direction of said respective valves so that said circuit is closed through said respective reactors.

17. A saturable-reactor device, comprising alternating-current supply terminals and load terminals and having two parallel branches between said supply terminals and said load terminals, each of said two branches having a saturable reactor and a valve series-connected with each other, said valves being opposingly poled to conduct positive and negative current half waves respectively, a direct-current cross connection circuit extending between respective points intermediate the reactor and valve of each branch, load-responsive direct-voltage supply means connected with said circuit to impress thereon a voltage dependent upon an electric load condition of the reactor circuit, and direct-current-supply means of normally constant voltage connected in said cross connection circuit in series relation with said load-responsive supply means to impress upon said cross connection a resultant voltage composed of a variable component and a constant component.

18. A saturable-reactor device, comprising alternating-current supply terminals and load terminals and having two parallel branches between said supply terminals and said load terminals, each of said two branches having a saturable reactor and a valve series-connected with each other, said valves being opposingly poled to conduct positive and negative current half waves respectively, a direct-current cross connection circuit extending between respective points intermediate the reactor and valve of each branch, load-responsive-direct-voltage supply means connected with said circuit to impress thereon a voltage dependent upon an electric load condition of the reactor circuit, and direct-current-supply means of normally constant voltage connected in said cross connection circuit in series relation with said load-responsive supply means to impress upon said cross connection a resultant voltage composed of a variable component and a constant component, said load-responsive direct-voltage supply means being connected across said load terminals so that said variable voltage component is substantially proportional to the load voltage.

19. A saturable-reactor device, comprising alternating-current supply terminals and load terminals and having two parallel branches between said supply terminals and said load terminals, each of said two branches having a saturable-reactor and a valve series-connected with each other, said valves being opposingly poled to conduct positive and negative current half waves respectively of the alternating-current, and a direct-current circuit connected across said two branches between respective points intermediate the reactor and valve of each branch and having a unidirectional voltage drop due to flow of load current through said branches, and direct-current voltage supply means connected with said latter circuit to equally oppose the voltage drop in the reactors of said branches, said connection being poled in opposition with respect to said valves.

20. A saturable-reactor device, comprising alternating-current supply terminals and load terminals and having two parallel branches between said supply terminals and said load terminals, each of said two branches having a saturable-reactor and a valve series-connected with each other, said valves being opposingly poled to conduct positive and negative current half waves respectively, a cross circuit connected across said two branches between respective points intermediate the reactor and valve of each branch, rectifier means inputwise connected with at least one of said reactors to be impressed with voltage proportional to reactor voltage and outputwise connected with said cross circuit to impress between said points a rectified control voltage substantially proportional to said reactor voltage, and an ohmic resistor connected in said cross circuit in series with said rectifier means.

21. A saturable-reactor device, comprising alternating-current supply terminals and load terminals and having two parallel branches between said supply terminals and said load terminals, each of said two branches having a saturable-reactor and a valve series-connected with each other, said valves being opposingly poled to conduct positive and negative current half waves respectively, a cross circuit connected across said two branches between respective points intermediate the reactor and valve of each branch, and rectifier means inputwise connected with at least one of said reactors to be impressed with voltage proportional to reactor voltage and outputwise connected with said cross circuit to impress between said points a rectified control voltage substantially proportional to said reactor voltage, said rectified control voltage being rated for maintaining the load current substantially constant regardless of voltage variations at said supply terminals.

22. A saturable-reactor device, comprising alternating-current supply terminals and load terminals and having two parallel branches between said supply terminals and said load terminals, each of said two branches having a saturable reactor and a valve series-connected with each other, said valves being opposingly poled to conduct positive and negative current half waves respectively, a direct-current cross connection circuit extending between respective points intermediate the reactor and valve of each branch, load-responsive direct-voltage supply means connected with said circuit to impress thereon a variable component voltage dependent upon an electric load condition of the reactor circuit, and direct-current supply means of normally constant voltage connected to said cross connection circuit in parallel relation with said load-responsive supply means, whereby said cross connection is impressed by a resultant voltage composed of said variable component and a constant component.

References Cited in the file of this patent

UNITED STATES PATENTS

| | | |
|---|---|---|
| 2,126,790 | Logan | Aug. 16, 1938 |
| 2,429,827 | Lamm | Oct. 28, 1947 |
| 2,465,451 | Hedstrom et al. | Mar. 29, 1949 |
| 2,470,556 | Hedstrom et al. | May 17, 1949 |
| 2,567,383 | Krabbe et al. | Sept. 11, 1951 |

FOREIGN PATENTS

| | | |
|---|---|---|
| 555,004 | Great Britain | July 29, 1943 |